US012682465B1

(12) United States Patent
Kucherenko et al.

(10) Patent No.: US 12,682,465 B1
(45) Date of Patent: Jul. 14, 2026

(54) MOTION CAPTURE DATA PREDICTION SYSTEM FOR VIDEO GAME DEVELOPMENT

(71) Applicant: Electronic Arts Inc., Redwood City, CA (US)

(72) Inventors: Taras Kucherenko, Stockholm (SE); Judith Butepage, Stockholm (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 195 days.

(21) Appl. No.: 18/510,166

(22) Filed: Nov. 15, 2023

(51) Int. Cl.
G06T 7/20 (2017.01)
A63F 13/00 (2014.01)
G06N 20/00 (2019.01)

(52) U.S. Cl.
CPC .............. G06T 7/20 (2013.01); A63F 13/00 (2013.01); G06N 20/00 (2019.01)

(58) Field of Classification Search
CPC ............ G06T 7/20; A63F 13/00; G06N 20/00
See application file for complete search history.

(56) References Cited

U.S. PATENT DOCUMENTS

| | | | |
|---|---|---|---|
| 2018/0070864 A1 | 3/2018 | Schuster | |
| 2018/0096259 A1* | 4/2018 | Andrews | ................. G06N 3/08 |
| 2020/0058148 A1 | 2/2020 | Blaylock | |
| 2022/0230376 A1 | 7/2022 | Rozantsev | |
| 2023/0123820 A1 | 4/2023 | Wang | |

OTHER PUBLICATIONS

"Taras Kucherenko et. al., A Neural Network Approach to Missing Marker Reconstruction in Human Motion Capture, Sep. 2028, arXiv: 1803.02665" (Year: 2028).*
"Endah Suryawati Ningrum et. al., Early Detection of Infant Cerebral Palsy Risk based on Pose Estimation using OpenPose and Advanced Algorithms from Limited and Imbalance Dataset, Jun. 2023, 2023 IEEE International Symposium on Medical Measurements and Applications" (Year: 2023).*
"Jeffrey Donahue et. al., Long-term recurrent convolutional networks for visual recognition and description, 2015, In IEEE Conference on Computer Vision and Pattern Recognition" (Year: 2015).*
Kucherenko, Taras, A Neural Network Approach to Missing Marker Reconstruction in Human Motion Capture, arXiv:1803.02665v4, 7 pages, dated Sep. 25, 2018.
Holden, Daniel et al., Robust Solving of Optical Motion Capture Data by Denoising, ACM Transactions on Graphics, vol. 38, No. 1, Article 165, 12 pages, dated Mar. 2018.
Kaufmann, Manuel et al., Convolutional Autoencoders for Human Motion Infilling, arXiv:2010.11531v1, 12 pages, dated Oct. 22, 2020.

* cited by examiner

*Primary Examiner* — Chineyere Wills-Burns
*Assistant Examiner* — Phuong Hau Cai
(74) *Attorney, Agent, or Firm* — Gray Ice Higdon

(57) ABSTRACT

Implementations described herein relate to a method for predicting motion capture data implemented by a video game development system comprising one or more processors, the method including: obtaining, by one or more of the processors of the video game development system, motion capture data; the motion capture data including one or more missing values; generating, by one or more of the processors of the video game development system, a predicted value for the one or more missing values, generating a predicted value includes processing the motion capture data using one or more machine learning models to determine the predicted value.

16 Claims, 7 Drawing Sheets

100

MOTION CAPTURE DATA INCLUDING MISSING VALUE(S)
101

MACHINE-LEARNED MOTION CAPTURE DATA PREDICTION SUBSYSTEM
102

PREDICTED MOTION CAPTURE DATA FOR MISSING VALUE(S)
103

MOTION
CAPTURE DATA
INCLUDING
MISSING
VALUE(S)

101

MACHINE-LEARNED
MOTION CAPTURE DATA
PREDICTION SUBSYSTEM

102

PREDICTED
MOTION
CAPTURE DATA
FOR MISSING
VALUE(S)

103

250

PROCESS INPUT MOTION CAPTURE DATA BY THE ONE OR MORE MACHINE LEARNING MODELS TO GENERATE PREDICTED VALUES FOR EACH ELEMENT OF THE INPUT DATA

251

OVERWRITE PREDICTED VALUES FOR EXISTING DATA WITH ORIGINAL VALUES

252

YES    FURTHER ITERATIONS?

253

NO

OUTPUT PREDICTED VALUES COMPRISING PREDICTED VALUES FOR MISSING DATA AND ORIGINAL VALUES FOR EXISTING DATA

254

300

INPUT LAYER ———→ 1D CONVOLUTION ———→ DROPOUT ———→ LEAKY RELU ———→ LINEAR 301                      302                303              304           305

400

OBTAIN MOTION CAPTURE DATA COMPRISING ONE OR MORE MISSING VALUES

401

GENERATE A PREDICTED VALUE FOR THE ONE OR MORE MISSING VALUES, WHEREIN GENERATING A PREDICTED VALUE COMPRISES PROCESSING THE MOTION CAPTURE DATA USING ONE OR MORE MACHINE LEARNING MODELS TO DETERMINE THE PREDICTED VALUE

402

600

VOLATILE MEMORY

604

PROCESSOR ARRANGEMENT

602

606

NON-VOLATILE MEMORY

OPERATING INSTRUCTIONS

608

MOTION CAPTURE DATA PREDICTION SYSTEM FOR VIDEO GAME DEVELOPMENT

BACKGROUND

Motion capture technology can be used to digitally record the movements of actors. Video games can use the recorded movements to provide more realistic movements for video game characters to create more immersive video games. Generally in motion capture, an actor or object is equipped with trackable markers or a suit with trackable markers (e.g., a motion capture suit). A motion capture system detects, tracks, and records the position of the trackable markers during a performance. It is possible that certain trackable markers (or "markers" in short) are not detected at during the performance due to occlusion of those markers given the actor's or object's positioning, e.g. lying down, or occlusion by other actors or objects in a scene. As such, it is possible that motion capture data includes missing or a lack of values from the trackable markers. Correction of such missing data using current techniques can be a laborious and time-consuming process.

SUMMARY

In accordance with a first aspect, there is provided a method for predicting motion capture data implemented by a video game development system comprising one or more processors, the method comprising: obtaining, by one or more of the processors of the video game development system, motion capture data; wherein the motion capture data comprises one or more missing values; generating, by one or more of the processors of the video game development system, a predicted value for the one or more missing values, wherein generating a predicted value comprises: processing the motion capture data using one or more machine learning models to determine the predicted value.

In accordance with a second aspect, there is provided a video game development system comprising: one or more processors; and one or more computer readable storage media comprising processor readable instructions to cause the one or more processors to carry out a method comprising: obtaining motion capture data; wherein the motion capture data comprises one or more missing values; generating a predicted value for the one or more missing values, wherein generating a predicted value comprises: processing the motion capture data using one or more machine learning models to determine the predicted value.

In accordance with a third aspect, there is provided one or more non-transitory computer-readable storage media comprising instructions which, when executed by one or more processors of a video game development system, cause the one or more processors to carry out a method comprising: obtaining motion capture data; wherein the motion capture data comprises one or more missing values; generating a predicted value for the one or more missing values, wherein generating a predicted value comprises: processing the motion capture data using one or more machine learning models to determine the predicted value.

DETAILED DESCRIPTION

General Definitions

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "video game" as used in some embodiments described herein, is a virtual interactive environment in which players engage.

A "missing value" as used in some embodiments herein, refers to a data value that is expected within some data but is not present. Thus, in some embodiments, data that comprises one or more missing values in physical reality includes only non-missing values with the missing values physically absent from the data. In other embodiments, the data may comprise a null value, zero value or other appropriate placeholder value to represent a missing value in the data. Thus, the data includes non-missing values and placeholder values to represent the missing values.

The systems and methods described in this specification enable the automatic prediction of missing values in motion capture data through the use of machine learning. Motion capture data may have missing values if the motion capture system is unable to detect a corresponding marker, such as during the recording or capture of a motion capture scene (e.g., a performance). This may occur if the marker is hidden due the positioning of an actor or objects within a scene. Typically, in animation generation, such as in video game development, missing data or values corresponding to a marker may be corrected manually. This clean-up of motion capture data however is a time-consuming and laborious task. The systems and methods described herein greatly reduces the amount of manual motion capture data cleaning required. For example, a motion capture data prediction system according one embodiment is capable of accurately predicting values for gaps of up to 20 seconds. In another example, the motion capture data prediction system is capable of handling single actor and multiple actor scenarios.

Figure 1:
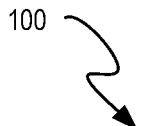
FIG. 1 is a schematic block diagram illustrating an example of a computer system for predicting motion capture data.
Figure 1:
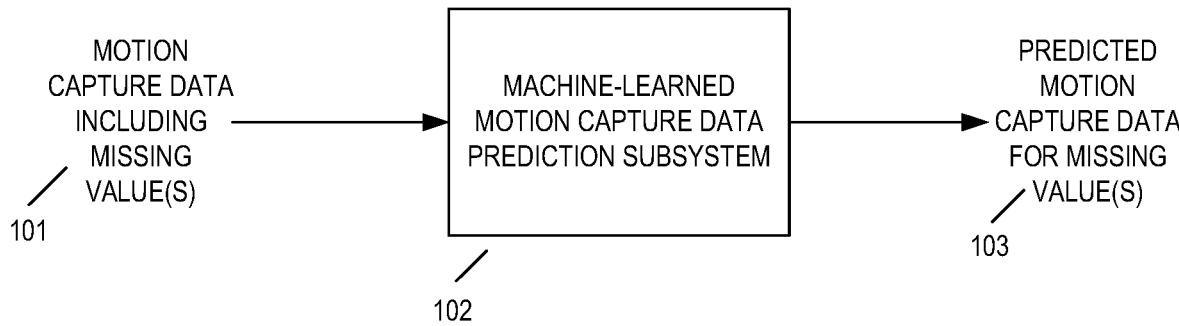

FIG. 1 is a schematic block diagram illustrating an example of a motion capture data processing system 100 for predicting motion capture data. The system 100 may be part of a video game development system or may interface with a video game development system.

The system 100 may be implemented by one or more processors located in one or more locations. The system 100 may comprise a server, desktop computer, a mobile device such as a laptop, smartphone or tablet, or any other suitable computing apparatus. The system 100 may be a distributed system or cloud-based system.

The system 100 is configured to obtain motion capture data 101. The motion capture data 101 may comprise the positions of one or more markers in 3D space tracked over a plurality of time frames as determined by a motion capture system. The position of each marker may, for example, be recorded as cartesian co-ordinates, e.g. an x, y and z co-ordinate in 3D space. In one example, the motion capture system has a sampling rate of 120 frames per second, i.e. 120 data points are uniformly recorded per second for each marker. In some instances, 30-60 markers may be used to track the movements of one actor. Markers may also be used to track the movement of props/objects that an actor inter-acts with during a performance. The motion capture data 101 may comprise a table or matrix having entries of spatial co-ordinates for each marker at each temporal frame. In one example, the motion capture data 101 is encoded using the "C3D" file format.

The motion capture data 101 may be obtained by any appropriate means. For example, the motion capture data 101 may be retrieved from local storage or received via a network from a remote system such as a server or the motion capture system itself.

In some embodiments, the obtained motion capture data 101 is missing values of one or more markers for one or more time frames. For simplicity, "missing values" is used herein, in short, to refer to trackable marker's values or data from a time instance or frame of motion capture session or performance that is missing or lacking from among the motion capture data.

Missing values in the motion capture data 101 may be represented by a null value such as a zero or other appro-priate encoding. Missing values may occur when a marker is hidden from view by the detectors of the motion capture system. For example, a marker may be occluded due to the position of the actor, such as where the actor is lying down, or other actors or objects in the scene may be occluding a marker. In some cases, a marker may have missing values for 2 to 3 seconds. In other cases, gaps can be as long as 20 seconds. In a single actor scenario, typically one or two markers may be occluded though in some cases 8 markers may be missing, typically corresponding to a single limb. In a two actor scenario, for example, where the actors are wrestling or grappling, many more markers may have miss-ing values, for example, up to half of a total of 120 markers may be missing at any one time.

The system 100 comprises a machine-learned motion capture data prediction subsystem 102 that is configured to generate a predicted value for the one or more missing values. The machine-learned subsystem 102 is configured to process the motion capture data 101 using one or more machine learning models to determine a predicted value for the one or more missing values. The machine-learned sub-system 102 is described in further detail below. In some embodiments, the machine-learned subsystem 102 is con-figured to provide predicted values for all existing values of the motion capture data 101. That is, the machine-learned subsystem 102 can provide predictions for missing values and to re-estimate existing values. In some cases, markers may be inaccurately detected by the motion capture system and the machine-learned subsystem 102 may be configured to correct erroneous data. In these embodiments, if only the missing values are of interest, the predictions for the existing values may be discarded/ignored.

The system 100 may be configured to provide the pre-dicted motion capture data 103 including the predicted values as an output. The predicted motion capture data 103 may be provided to an animation system whereby animators may use the predicted data to create realistic movements for video game characters.

Figure 2:
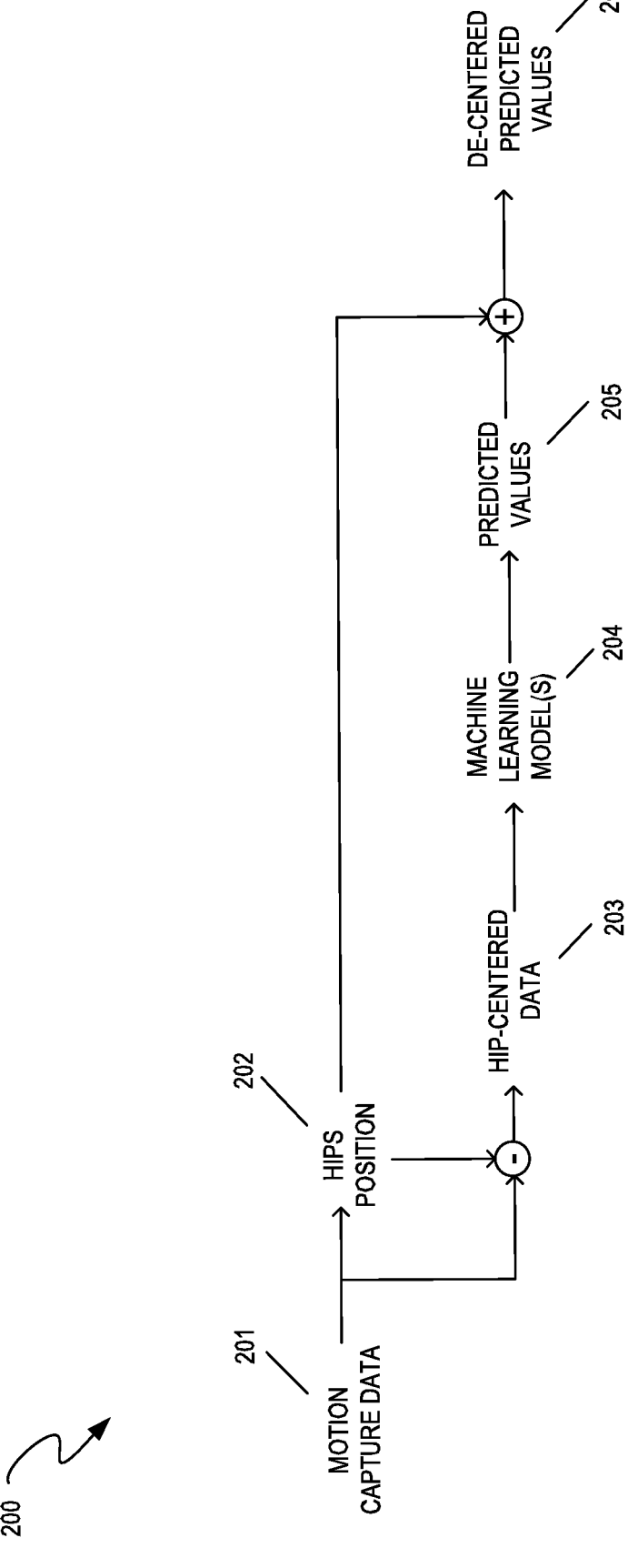
FIG. 2 is a schematic block diagram of an example machine-learned motion capture data prediction subsystem according to an embodiment.

Referring now to FIG. 2, an example machine-learned motion capture data subsystem 200 will now be described in more detail. The subsystem 200 may comprise one or more processors located in one or more locations.

Generally, the subsystem 200 can be configured to hip-center the motion capture data prior to processing by one or more machine learning models to generate predicted values.

In more detail, the obtained motion capture data 201 comprises data associated with one or more hip markers located at the hips of an actor. In one example, there are four markers associated with the hips. The subsystem 200 may be configured to process the obtained motion capture data 201 to determine a position of the hips 202 based upon the data associated with the one or more hip markers. For example, the spatial co-ordinates of the hip markers in the data may be averaged for each frame. In this case, the hip position may be determined for each frame and may be considered a trajectory.

The subsystem 200 may then be configured to center the motion capture data 201 based upon the determined position of the hips 202. For example, the determined position of the hips 202 may be subtracted from the data. By hip-centering the motion capture data, the data may be normalized to an egocentric viewpoint, providing invariance against the spe-cific location of the actor within 3D space which may make learning/prediction easier. Whilst, other markers may be used for centering, typically, hip data is always present in motion capture data as during recording, if the hip markers are not visible, the performance capture is re-done.

The subsystem 200 comprises one or more machine learning models 204 which may be configured to process the hip-centered data 203 to generate predicted values 205 for the missing values in the hip-centered data 203. The one or more machine learning models 204 are described in more detail below. In some embodiments, the one or more machine learning models 204 are configured to iteratively refine the predicted values.

Figure 2A:
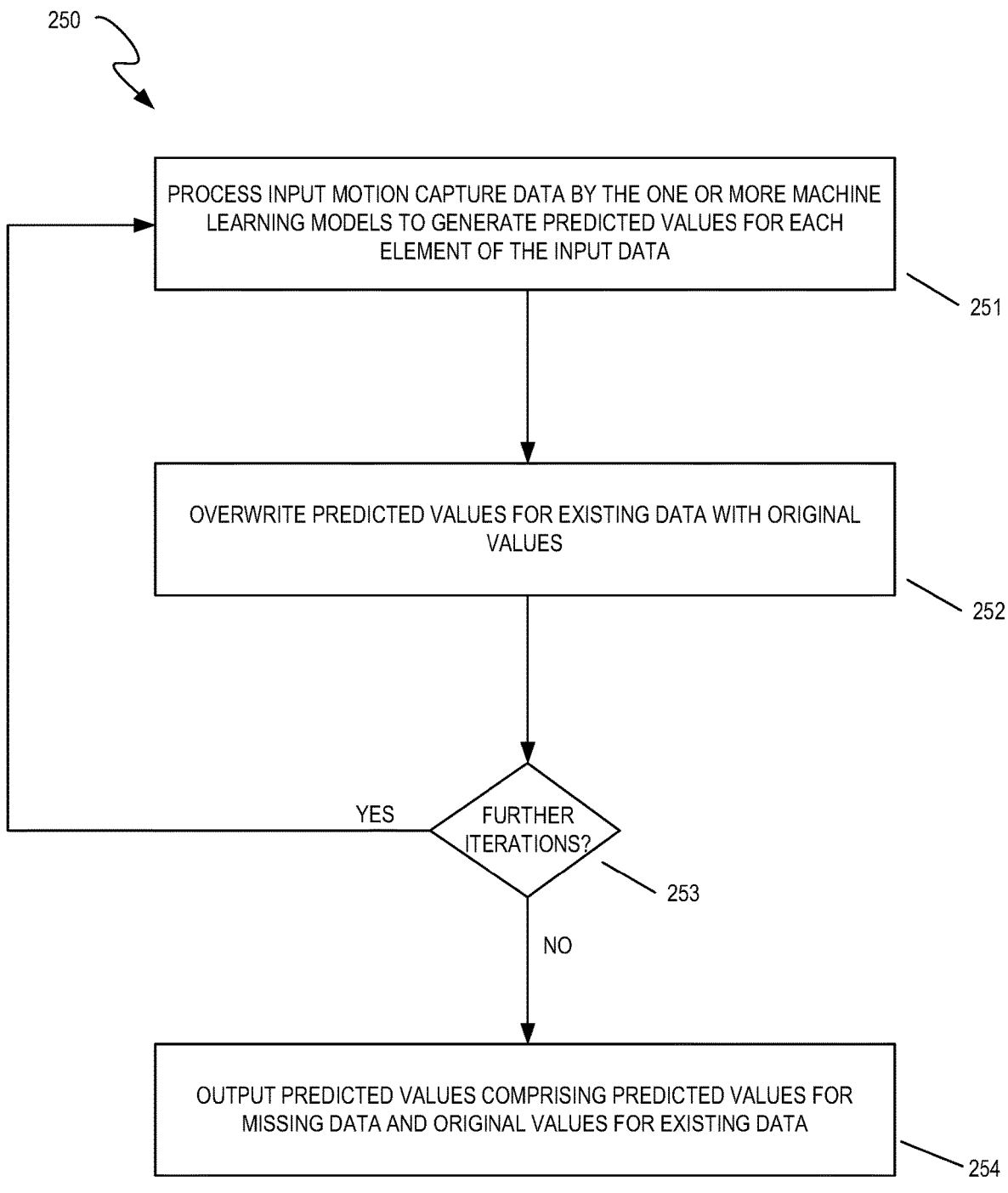
FIG. 2A is a flowchart illustrating an example method for predicting motion capture data.

FIG. 2A is a flow diagram illustrating an example method 250 for iteratively refining the predicted values. In step 251, the one or more machine learning models processes the input motion capture data to generate predicted values for each element of the input data. Thus, in this example, the one or more machine learning models are configured to provide predicted values for all elements of motion capture data input to the one or more machine learning models including both existing and missing data. The input motion capture data may be the hip-centered data 203.

In step 252, the predicted values for the existing data are overwritten with the original values for the existing data. Thus, in this example, only the generation of predictions for the missing data is of interest.

In step 253, it is determined whether further iterations are to be carried out. For example, a fixed number of iterations may be carried out. In one example, five iterations are performed, although it will be appreciated that any appro-priate number of iterations may be performed and/or other suitable stopping criterion may be used.

If it is determined that further iterations are to be carried out, processing returns to step 251 whereby the one or more machine learning models processes the motion capture data comprising the predicted values for the missing data and original values for existing data for refining the prediction.

If it is determined that no further iterations are necessary, processing proceeds to step 254 whereby the motion capture data comprising the predicted values for the missing data and original values for existing data is output.

In some embodiments, step 252 may be omitted to allow for re-estimation of the existing data. In some embodiments, the one or more machine learning models may be configured to provide only predicted values for the missing data and not the existing data. In these embodiments, step 252 may also be omitted as appropriate.

Referring back to FIG. 2, the subsystem 200 may be configured to de-center the predicted values generated by the one or more machine learning models 204 based upon the determined position of the hips 202. That is, the inverse of hip-centering is performed. For example, the determined position of the hips 202 may be added to the predicted values. The de-centering transforms the predicted values back to the spatial co-ordinate system of the original motion capture data 201. The subsystem 200 may be configured to provide as output the de-centered predicted values 206. The subsystem 200 may be configured to provide de-centered predicted values 206 in place of the missing values in the original motion capture data 201.

In some embodiments, a filter may be applied to the predicted values to temporally smooth the predicted values. The smoothing may be carried out at any appropriate point. For example, the smoothing may be carried out after predicted values have been generated by the one or more machine learning models, prior to any de-centering. The smoothing may be carried out for each iteration if an iterative process is used or the smoothing may be carried out once prior to output or as appropriate.

Figure 3:
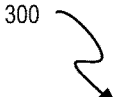
FIG. 3 is a schematic block diagram of an example neural network for predicting missing motion capture data according to an embodiment.

The one or more machine learning models referred to above may comprise one or more neural networks. FIG. 3 is a schematic block diagram of one exemplary neural network architecture that may be used for generating predicted values for missing motion capture data. In FIG. 3, the neural network 300 comprises an input layer 301 that is configured to receive the input motion capture data.

The neural network 300 may comprise a first one-dimensional convolutional layer 302. The one-dimensional convolution may be performed along the time axis. In this regard, the input motion capture data may be re-organised such that the positional data for each marker is arranged in a single vector for each time frame. For example, where the positional data is a set of cartesian co-ordinates in 3D space for each marker, these may be arranged in a sequence to provide a vector of size 3× the number of markers for each time frame. Thus, each positional element may be considered a channel for which one-dimensional convolution in time is carried out. The input motion capture data may be further re-arranged into batches such that the data comprises a 3-dimensional tensor having dimensions N×T×D, where N is the number of batches, T is the temporal dimension, and D is the vectorized spatial dimension. However, it will be appreciated that other suitable arrangements of the input data may be used.

The input motion capture data may also be pre-processed to remove values from the motion capture data based upon a temporal window determined from the one or more missing values. For example, a temporal window may be centered on a gap in the data. The five frames before and after the gap may be removed and marked as missing. Typically, the data immediately before and after missing data is inaccurate and as such, removing/marking such values as missing will ensure that these values are re-estimated with more accurate values. It will be appreciated that any shape or size of temporal window may be used as deemed appropriate by a person skilled in the art.

In some embodiments, the input data may also be pre-processed to have zero mean and unit standard deviation. A corresponding post-processing inverse operation may also be carried out in such embodiments.

Referring back to the one-dimensional convolutional layer 302, in some embodiments, the size of the convolutional kernels are relatively small. For example, the kernel size may be up to ten frames in length which corresponds to approximately 0.1s at 120 frames per second. It will be appreciated that any appropriate kernel size may be used as deemed appropriate by a person skilled in the art. The kernel size may be dependent on the typical gap sizes of the missing data for example.

Subsequent to the one-dimensional convolution, a dropout operation 303 may be carried out. In general, dropout is a regularization technique that randomly sets a subset of activations to zero according to a dropout rate. Dropout is typically used during training of a neural network. During inference, it may be desirable to retain all activations to maximize performance. Instead of setting activations to zero, all activations may be scaled down to take account of dropout having been used during training and the lower activation values produced as a result.

The neural network 300 may further comprise a Leaky Rectified Linear Unit (LeakyReLU) layer 304. The LeakyReLU operation multiplies an input by a small fixed scalar if the input is negative whilst any positive input is passed through unchanged. It will be appreciated however that other non-linear functions may be used as deemed appropriate by a person skilled in the art.

The neural network 300 may further comprise a linear output layer 305 that provides predicted values for the one or more missing values in the input motion capture data. The linear output layer 305 may also provide re-estimated values for each original value in the input motion capture data.

The neural network architecture of FIG. 3 provides a lightweight architecture that has low latency (fast at generating output predictions) and can be trained using small training dataset sizes. Whilst FIG. 3 shows a specific neural network architecture, it will be appreciated that such an architecture is exemplary and not intended to be limiting. Alternative architectures may be used, for example, it is possible to use a recurrent neural network architecture though this may be slower at generating output predictions. Another possible alternative architecture is a Transformer architecture, though Transformer architectures typically require large amounts of data to train.

The one or more machine learning models may be trained using any appropriate training method. For example, supervised learning may be used with a training dataset comprising a plurality of training examples, each training example having input motion capture data with missing values and corresponding ground-truth data for the missing values as target outputs for the one or more machine learning models. In one example, a training dataset comprising approximately 100,000 to 200,000 frames of data corresponding to 15 to 20 minutes of motion capture data may be used. This is a relatively small size of dataset as labelled motion capture data is difficult to obtain. As discussed above, a neural network architecture such as that of FIG. 3 may be used to effectively learn from a small training dataset.

A neural network according to FIG. 3 may be trained using backpropagation and stochastic gradient descent or any other appropriate optimization technique for neural networks. A mean-squared error loss or other appropriate loss function may be used. Training may be carried out on the basis of mini-batches and may continue until a threshold performance level is reached or a fixed number of iterations have been performed.

In some embodiments, the training dataset may be augmented with synthetic data. For example, synthetic training examples may be generated by modifying existing training examples. This may be performed by introducing missing values into existing complete motion data on the basis of a probability distribution determined from the existing training data with missing values. The synthetic data may therefore be representative of the real training data. In addition, or alternatively, synthetic data may be generated by other transformations of the existing training data.

Figure 4:
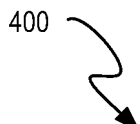
FIG. 4 is a flowchart illustrating an example method for predicting motion capture data.
Figure 4:
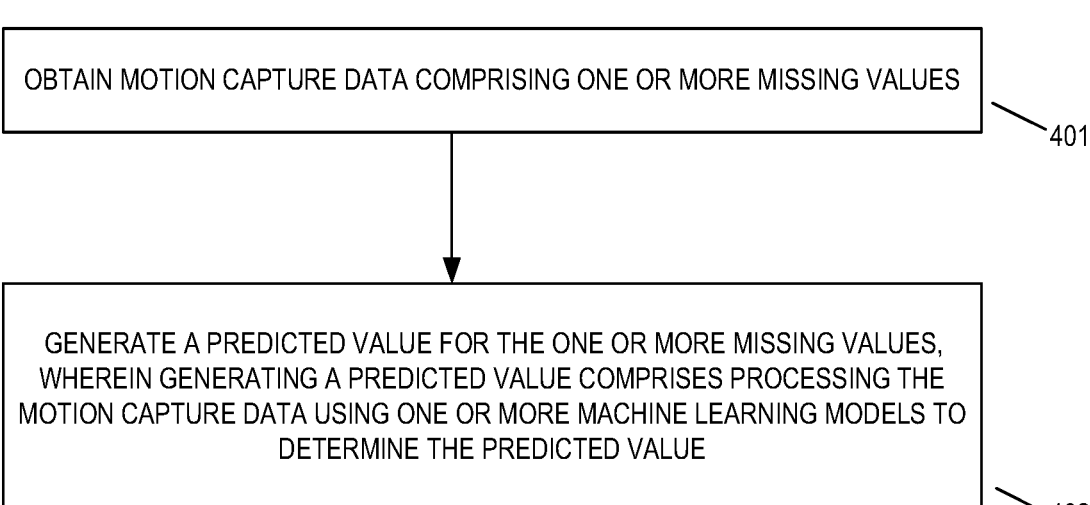

FIG. 4 is a flow diagram illustrating an example method 400 for predicting motion capture data. The processing shown in FIG. 4 may be carried out by the systems of FIGS. 1 and 2.

In step 401, motion capture data is obtained by one or more processors. The motion capture data may be obtained by any appropriate means. For example, the motion capture data 101 may be retrieved from local storage or received via a network from a remote system such as a server or the motion capture system itself.

As discussed above, the motion capture data may comprise the positions of one or more markers in 3D space tracked over a plurality of time frames as determined by a motion capture system. The position of each marker may be recorded as cartesian co-ordinates, e.g. an x, y and z co-ordinate in 3D space for example.

The motion capture data comprises one or more missing values. Missing values in the motion capture data 101 may be represented by a null value such as a zero or other appropriate encoding. Missing values may occur when a marker is hidden from view by the detectors of a motion capture system. For example, a marker may be occluded due to the position of the actor, such as where the actor is lying down, or other actors or objects in the scene may be occluding a marker.

In step 402, a predicted value for the one or more missing values is generated by the one or more processors. Generating a predicted value comprises processing the motion capture data using one or more machine learning models to determine the predicted value. The one or more machine learning models may comprise one or more neural networks such as that shown in FIG. 3 and described above. The one or more neural networks may comprise one or more one-dimensional convolutional layers. The one-dimensional convolutional layer may be a convolution in the time-axis. The one or more neural networks may further comprise operations such as dropout and/or a leaky rectified linear unit. The one or more neural networks may further comprise a linear output layer that provides the predicted values. It will be appreciated that the neural network may comprise other operations and types of layer as deemed appropriate by a person skilled in the art.

In some embodiments, predicted values for all existing values of the input motion capture data are generated. In these embodiments, if only the missing values are of interest, the predictions for the existing values may be discarded/ignored.

As discussed above, in some embodiments, the motion capture data may be pre-processed to remove values from the motion capture data based upon a temporal window determined from the one or more missing values. For example, a temporal window may be centered on a gap in the data. The five frames before and after the gap may be removed and marked as missing. Typically, the data immediately before and after missing data is inaccurate and as such, removing/marking such values as missing will ensure that these values are re-estimated with more accurate values. It will be appreciated that any shape or size of temporal window may be used as deemed appropriate by a person skilled in the art.

The predicted values may replace the missing values in the input motion capture data. The motion capture data with the predicted values may be provided to an animation system whereby animators may use the predicted data to create realistic movements for video game characters.

Figure 5:
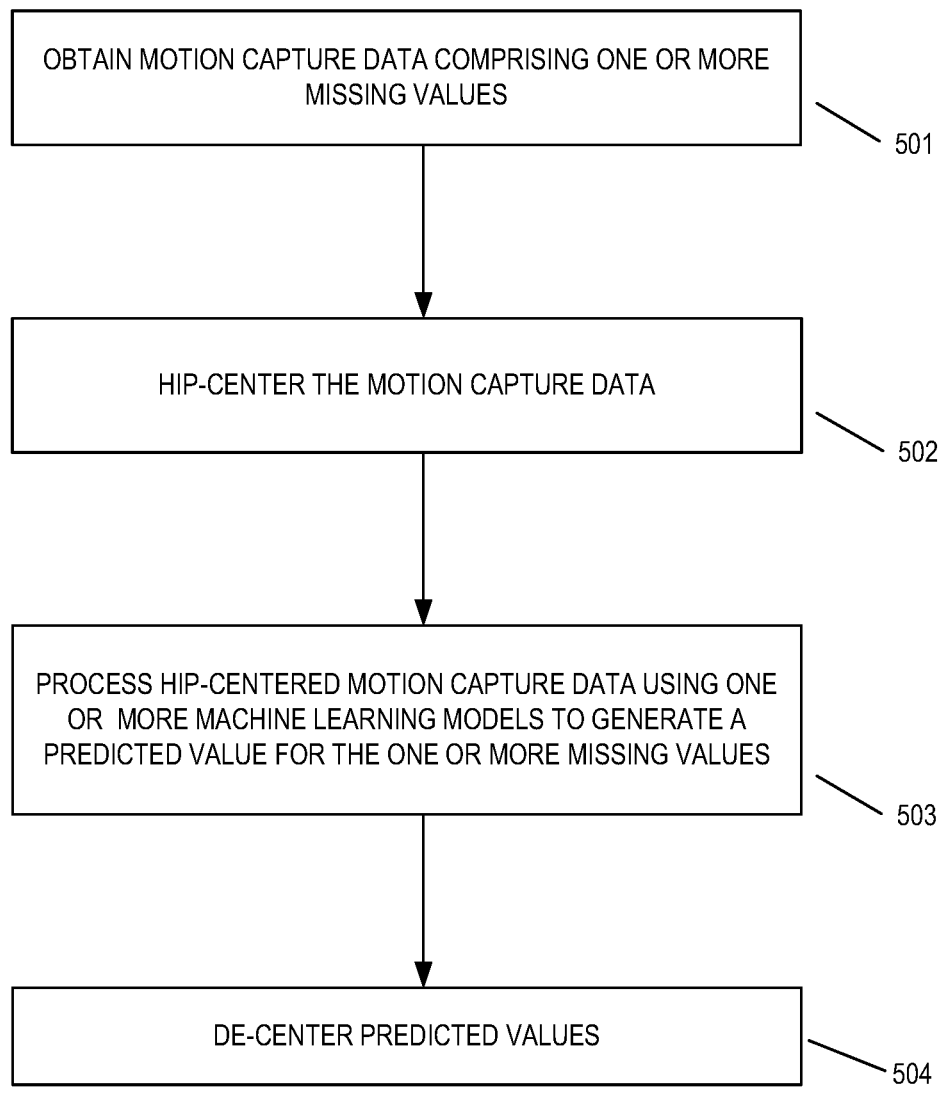
FIG. 5 is a flowchart illustrating an example method for predicting motion capture data in more detail.

FIG. 5 is a flow diagram illustrating the example method of FIG. 4 in more detail.

Similar to step 401, in step 501, motion capture data comprising one or more missing values is obtained. In step 502, the motion capture data is hip-centered. As discussed above, a position of the hips may be determined based upon the data associated with the one or more hip markers in the obtained motion capture data. In one example, there are four markers associated with the hips. The spatial co-ordinates of the hip markers in the data may be averaged for each frame to determine a position of the hips.

The motion capture data may be centered based upon the determined position of the hips. For example, the determined position of the hips may be subtracted from the data. By hip-centering the motion capture data, the data may be normalized to an egocentric viewpoint, providing invariance against the specific location of the actor within 3D space which may make learning/prediction easier.

In step 503, the hip-centered motion capture data is processed by one or more machine learning models to generate a predicted value for the one or more missing values. This may be carried out as described above using one or more neural networks.

In step 504, the predicted values are de-centered, that is, an inverse of the hip-centering operation in step 502 is carried out to return the predicted values to original spatial co-ordinate system.

Figure 6:
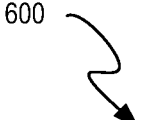
FIG. 6 shows a schematic example of a system/apparatus for performing any of the methods described herein.
Figure 6:
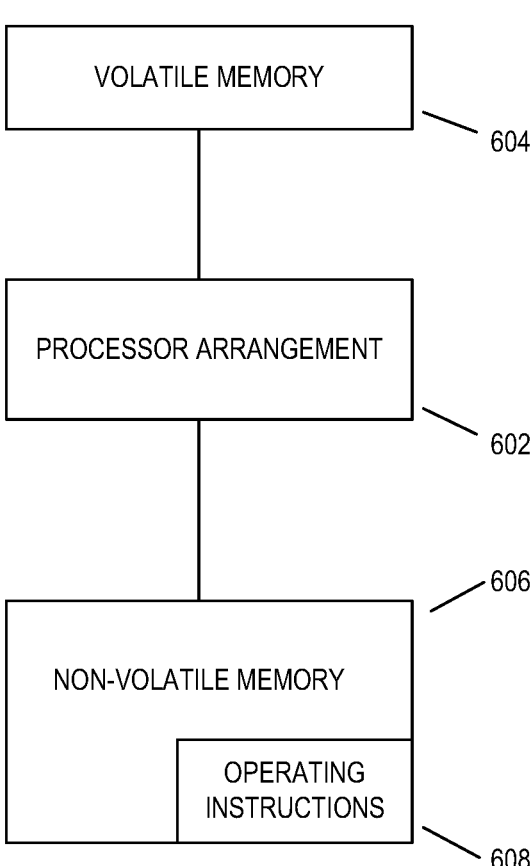

FIG. 6 shows a schematic example of a system/apparatus 600 for performing any of the methods described herein. The system/apparatus shown is an example of a computing device. It will be appreciated by a person skilled in the art that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general purpose processor. The one or more processors 602 may be a single core device or a multiple core device. The one or more processors 602 may comprise a central processing unit (CPU) or a graphical processing unit (GPU). Alternatively, the one or more processors 602 may comprise specialised processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to temporarily store data generated during execution of said operating instructions 608.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A method for predicting motion capture data implemented by a video game development system comprising one or more processors, the method comprising:

obtaining, by one or more of the processors of the video game development system, motion capture data as generated by a motion capture system; wherein the motion capture data comprises one or more missing values; and generating, by one or more of the processors of the video game development system, a predicted value for the one or more missing values, wherein generating a predicted value comprises:

processing the motion capture data using one or more machine learning models to determine the predicted value; wherein the one or more machine learning models comprise one or more neural networks including one or more one-dimensional convolutional layers configured to perform one dimensional convolution along a temporal axis with the motion capture data arranged according to a plurality of dimensions comprising: (i) a temporal dimension and (ii) a spatial dimension formed by the positional elements for each marker of the motion capture data.

2. The method of claim 1, wherein generating a predicted value further comprises hip-centering the motion capture data prior to processing by the one or more machine learning models.

3. The method of claim 2, wherein the motion capture data comprises data associated with one or more hip markers;

wherein hip-centering the motion capture data comprises:

determining a position of the hips based upon the data associated with the one or more hip markers; and centering the motion capture data based upon the determined position of the hips.

4. The method of claim 2, wherein generating a predicted value further comprises de-centering the predicted value determined by the one or more machine learning models.

5. The method of claim 4, wherein the de-centering is based upon the determined position of the hips.

6. The method of claim 1, wherein processing the motion capture data by the one or more machine learning models to determine a predicted value comprises iteratively refining the predicted value by the one or more machine learning models.

7. The method of claim 1, wherein generating a predicted value further comprises removing values from the motion capture data based upon a temporal window determined from the one or more missing values prior to processing the motion capture data by the one or more machine learning models.

8. The method of claim 1, wherein the one or more machine learning models are configured to provide predicted values for all existing values of the motion capture data.

9. A video game development system comprising:

one or more processors; and one or more computer readable storage media comprising processor readable instructions to cause the one or more processors to carry out a method comprising:

obtaining motion capture data as generated by a motion capture system;

wherein the motion capture data comprises one or more missing values; and generating a predicted value for the one or more missing values, wherein generating a predicted value comprises:

processing the motion capture data using one or more machine learning models to determine the predicted value; wherein the one or more machine learning models comprise one or more neural networks including one or more one-dimensional convolutional layers configured to perform one dimensional convolution along a temporal axis with the motion capture data arranged according to a plurality of dimensions comprising: (i) a temporal dimension and (ii) a spatial dimension formed by the positional elements for each marker of the motion capture data.

10. The system of claim 9, wherein generating a predicted value further comprises hip-centering the motion capture data prior to processing by the one or more machine learning models.

11. The system of claim 10, wherein the motion capture data comprises data associated with one or more hip markers;

wherein hip-centering the motion capture data comprises:

determining a position of the hips based upon the data associated with the one or more hip markers; and centering the motion capture data based upon the determined position of the hips.

12. The system of claim 10, wherein generating a predicted value further comprises de-centering the predicted value determined by the one or more machine learning models.

13. The system of claim 9, wherein processing the motion capture data by the one or more machine learning models to determine a predicted value comprises iteratively refining the predicted value by the one or more machine learning models.

14. The system of claim 9, wherein generating a predicted value further comprises removing values from the motion capture data based upon a temporal window determined from the one or more missing values prior to processing the motion capture data by the one or more machine learning models.

15. The system of claim 9, wherein the one or more machine learning models are configured to provide predicted values for all existing values of the motion capture data.

16. One or more non-transitory computer-readable storage media comprising instructions which, when executed by one or more processors of a video game development system, cause the one or more processors to carry out a method comprising:

obtaining motion capture data as generated by a motion capture system; wherein the motion capture data comprises one or more missing values; and generating a predicted value for the one or more missing values, wherein generating a predicted value comprises:

processing the motion capture data using one or more machine learning models to determine the predicted value; wherein the one or more machine learning models comprise one or more neural networks including one or more one-dimensional convolutional layers configured to perform one dimensional convolution along a temporal axis with the motion capture data arranged according to a plurality of dimensions comprising: (i) a temporal dimension and (ii) a spatial dimension formed by the positional elements for each marker of the motion capture data.

* * * * *